United States Patent
Kim et al.

(10) Patent No.: US 6,870,965 B2
(45) Date of Patent: Mar. 22, 2005

(54) TEXTURE DESCRIPTION METHOD AND TEXTURE-BASED IMAGE RETRIEVAL METHOD USING GABOR FILTER IN FREQUENCY DOMAIN

(75) Inventors: Mun-churl Kim, Seo-gu (KR); Jin-woong Kim, Yusong-gu (KR); Banglore S. Manjunath, Santa Barbara, CA (US); Yong-man Ro, Yusong-gu (KR); Hyun-doo Shin, Seongnam (KR); Yang-lim Choi, Suwon (KR)

(73) Assignees: Samsung Electronics Co., Ltd., Kyungki-do (KR); Electronics and Telecommunications Research Institute, Taejeon (KR); Curitel Communications Inc., Kyoungki-do (KR); Heinrich-Hertz-Institut fur Nachrichtentechnik Berlin Gesellschaft mit Beschrankter Haftung, Berlin (DE); The Regents of the University of California, Oakland, CA (US); Information and Communications University Educational Foundation, Seoul (KR)

( * ) Notice: Subject to any disclaimer, the term of this patent is extended or adjusted under 35 U.S.C. 154(b) by 778 days.

(21) Appl. No.: 09/727,764

(22) Filed: Dec. 4, 2000

(65) Prior Publication Data

US 2001/0031103 A1 Oct. 18, 2001

(30) Foreign Application Priority Data

Dec. 3, 1999 (KR) .............................. 99-54904
Oct. 23, 2000 (KR) .............................. 00-62260

(51) Int. Cl.⁷ .............................. G06K 9/54
(52) U.S. Cl. .................. 382/305; 382/190; 382/260; 382/280; 707/3

(58) Field of Search ................... 382/260, 205, 382/280, 305, 218, 296, 181, 191, 276, 190; 707/2, 3

(56) References Cited

U.S. PATENT DOCUMENTS

| | | | | |
|---|---|---|---|---|
| 5,101,270 A | * | 3/1992 | Boone et al. | 348/61 |
| 5,949,907 A | * | 9/1999 | Raz | 382/205 |
| 6,192,150 B1 | * | 2/2001 | Leow et al. | 382/190 |
| 6,259,396 B1 | * | 7/2001 | Pham et al. | 342/90 |
| 6,624,821 B1 | * | 9/2003 | Shin et al. | 345/582 |
| 6,647,058 B1 | * | 11/2003 | Bremer et al. | 375/222 |

FOREIGN PATENT DOCUMENTS

| | | |
|---|---|---|
| JP | 11-110556 | 4/1999 |
| JP | 2001-134768 | 5/2001 |
| JP | 2002-536750 | 10/2002 |
| JP | 2002-540515 | 11/2002 |

* cited by examiner

*Primary Examiner*—Bhavesh M. Mehta
*Assistant Examiner*—Ali Bayat
(74) *Attorney, Agent, or Firm*—Sughrue Mion, PLLC

(57) ABSTRACT

A texture description method in a frequency domain for extracting texture features by transforming and Gabor-filtering an input image into an image of the frequency domain, and a texture-based retrieval method thereof are provided. The texture description method in the frequency domain includes: a first step of transforming an image of a time domain into an image of the frequency domain; a second step of filtering the transformed image using a Gabor filter having N×M filter regions, where N and M are respective predetermined positive integers; a third step of extracting feature values of the image that has been Gabor-filtered in respective channels of the frequency domain division layout corresponding to the N×M filter regions of the Gabor filter; and a fourth step of deciding a texture descriptor of the image on the basis of the feature values of the image.

70 Claims, 2 Drawing Sheets

TEXTURE DESCRIPTION METHOD AND TEXTURE-BASED IMAGE RETRIEVAL METHOD USING GABOR FILTER IN FREQUENCY DOMAIN

BACKGROUND OF THE INVENTION

1. Field of the Invention

The present invention relates to a texture description method of an image, and more particularly to a texture description method for transforming an image of a time domain into an image of a frequency domain and extracting texture features by Gabor filtering. Also, the present invention relates to a texture-based method of retrieving images indexed by the texture description method.

2. Description of the Related Art

Texture information and its application as an indication of important visual features of an image, have been studied for a long time. The texture information of an image is used as a low level descriptor for content-based indexing and abstracting an image or video data. Also, the texture information of the image is important in retrieving a specific photo of a digital photo album, or content-based retrieving in a tile or a textile database.

Presently, feature values are calculated in a time domain or a frequency domain in order to extract texture features of an image. In particular, a method of texture feature extraction in a frequency domain is known to be suitable for describing the texture features of images of a wide variety of forms.

A thesis on this method, entitled "Texture Features of Browsing and Retrieval of Image Data", by B. S. Manjunath and W. Y. Ma, published on IEEE Transaction on Pattern Analysis and Machine Intelligence, Volume 18, No. 8, on August 1996, describes a method for calculating feature vectors by extracting from the image obtained after Gabor filtering in the frequency domain, the mean and the variance of each channel as feature values of the texture of an image.

However, the image texture description method using the conventional Gabor filtering has problems. First, it takes a long time for calculation by performing the Gabor filtering of an image in a signal domain. Second, it is difficult to obtain enough information because the density of frequency samples of an image is low in the case where the texture information is extracted using the Gabor filter having a narrow pass band in a low frequency domain due to the use of an orthogonal frequency domain. Third, the size of data needed to describe features is great because both the mean and variance of an image brightness value are used as the texture features of the image.

SUMMARY OF THE INVENTION

To solve the above problems, it is an objective of the present invention to provide a texture description method and a texture-based image retrieval method in which the Gabor filtering is done in the frequency domain rather than the signal domain, so as to reduce a filtering calculation time.

It is another objective of the present invention to provide a texture description method and a texture-based image retrieval method using a Gabor filter in a frequency domain for extracting enough texture information of an image in a low frequency domain of the image by raising the sampling density of the frequency, and extracting enough texture information in spite of the Gabor filtering having a wide pass band by lowering the sampling density of the frequency in a high frequency domain, by performing the Gabor filtering using a polar coordinate system.

It is another objective of the present invention to provide a texture description method and a texture-based image retrieval method in a frequency domain for raising a retrieval rate using the average brightness values of an image, the variance of the brightness value of an image, energy, and a variance value of an energy for a feature descriptor of an image texture.

It is another objective of the present invention to provide, in consideration of human visual features, a texture description method and a texture-based image retrieval method using a Gabor filter in a frequency domain, by designing a frequency pass band of a low frequency domain to be narrower and the frequency pass band of a high frequency domain to be wider as the frequency domain becomes higher. Here, it is taken into consideration that the human visual system sensitive to changes of the low frequency components of an image and insensitive to changes of the high frequency components, when designing a Gabor filter.

It is another objective of the present invention to provide a texture description method and a texture-based image retrieval method using a Gabor filter in a frequency domain for easily retrieving an image changed by a minor amount by Gabor filtering so as not to change a value of an image texture descriptor if an image is rotated, magnified, or reduced by a small amount.

To accomplish the above object of the present invention, there is provided a texture description method using a Gabor filter in a frequency domain including:

a first step of transforming an image of a time domain into an image of a frequency domain;

a second step of filtering the transformed frequency domain using a Gabor filter having N×M filter regions, where N and M are predetermined positive integers;

a third step of extracting texture feature values of the Gabor filtered image in respective channels of a frequency domain division layout corresponding to the N×M filter regions of the Gabor filter; and a fourth step of determining a texture descriptor of the image on the basis of the texture feature values of the image.

Preferably, in the first step, the image of the time domain is Fourier-transformed into an image of the orthogonal coordinate system frequency domain, or the image of the time domain is Radon-transformed, and then one dimensional Fourier-transformed into an image of a polar coordinate system frequency domain.

Also, there is provided recording media which can be read by a computer in which is recorded a program for executing a texture description method using a Gabor filter in the frequency domain.

Also, there is provided a texture-based image retrieval method using a Gabor filter in a frequency domain including:

a first step of extracting a data texture descriptor by filtering data images using a Gabor filter and storing the extracted data texture descriptor in a data base;

a second step of extracting and storing a query texture descriptor of a query image, i.e., a sought after image, when the query image is inputted using the Gabor filter;

a third step of matching the data texture descriptor and the query texture descriptor and measuring a distance between two texture descriptors; and a fourth step of determining a similarity between two images according to the distance between two texture descriptors.

Preferably, in the first and second steps, the step of extracting the data texture descriptor and the query texture descriptor includes:

a first sub-step of transforming an image of a visual domain into an image of a frequency domain;

a second sub-step of filtering the image of the frequency domain using a Gabor filter having N×M filter regions, where N and M are predetermined positive integers;

a third sub-step of extracting texture feature values of the Gabor-filtered image in respective channels of the frequency domain division layout corresponding to the N×M filter regions of the Gabor filter; and a fourth step of describing the image texture descriptor using the texture feature values of the image.

Also, there is provided recording media which can be read by a computer in which is recorded a program for executing a texture-based image retrieval method using a Gabor filter in the frequency domain.

BRIEF DESCRIPTION OF THE DRAWINGS

The above objective(s) and advantages of the present invention will become more apparent by describing in detail a preferred embodiment thereof with reference to the attached drawings in which.

DETAILED DESCRIPTION OF THE INVENTION

Hereinafter, "a texture description method and a texture-based image retrieval method using a Gabor filter in a frequency domain" according to a preferred embodiment of the present invention will be described in detail with reference to the attached drawings.

Figure 1:
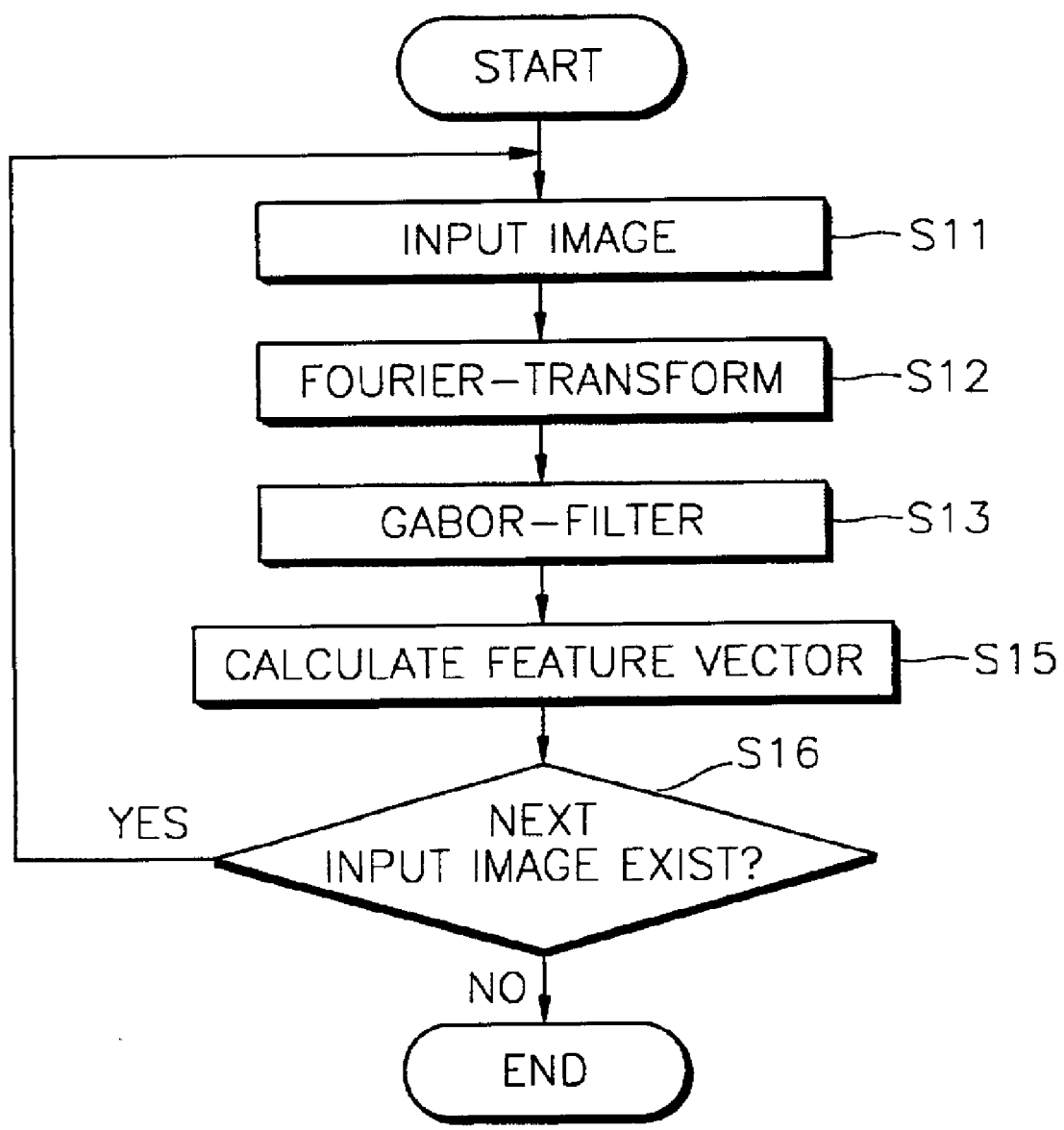
FIG. 1 is a flowchart illustrating a texture description method in the frequency domain according to a preferred embodiment of the present invention.

FIG. 1 is a flowchart illustrating a texture description method in the frequency domain using a Gabor filter according to the present invention.

The texture description method, a method for producing a texture descriptor by processing an input image is used for texture information-based indexing and texture information-based retrieving an image. That is, when images, which will be indexed in the database and stored, are input, data texture descriptors are produced according to the texture description method of FIG. 1, and the produced texture descriptors are stored in the database. Also, when a query image is inputted, texture descriptors of the query image are produced according to the texture description method of FIG. 1, and retrieval is performed by comparing the produced texture descriptors with the data images stored in the database.

Referring to FIG. 1, the texture description method according to the present invention will be described in greater detail.

First, a prescribed image is inputted (S11), and the input image is Fourier-transformed (S12) into an image of an orthogonal coordinate system or a polar coordinate system frequency domain. Here, the input image can be a data image or a query image as described above. The input image is two-dimensional Fourier-transformed into data of the orthogonal coordinate system frequency domain. Alternatively, the input image is Radon-transformed, and then the transformed data is one-dimensional Fourier-transformed into data of the polar coordinate system frequency domain.

The process of transforming the input image into the polar coordinate system frequency domain is described as follows.

First, the input image is Radon-transformed, wherein the Radon transform is a process of line-integrating a two-dimensional image or multi-dimensional multimedia data with respect to an angle to obtain one-dimensional projection data. That is, the shape of an object appears to change with respect to different viewing angles, and an object is seen from all angles, so that an outline of the object can be estimated. The Radon transform uses this principle.

A Radon transform formula for transforming the two-dimensional image is expressed as Formula 1.

$$p_\theta(R) = \int_{L(R,\theta)} f(x, y) dl \qquad (1)$$
$$= \int_{-\infty}^{\infty} \int_{-\infty}^{\infty} f(x, y) \delta(x\cos\theta + y\sin\theta - s) dx dy$$

Here, f(x,y) is an image function of an orthogonal coordinate system time domain, pθ(R) is a first projection function obtained by linear-integrating with respect to an axis having an angle of θ with the positive x-axis, and passing through the origin of the orthogonal coordinate system, that is, a first Radon-transform function. δ(x) is a function which becomes 1 when x is 0. A two-dimensional image has a region of −∞<x,y<∞ in the orthogonal coordinate system, and regions of 0<s<∞ and 0<θ<π in the Radon coordinate system. When x cos 0+y sin 0=s, δ(x cos 0+y sin 0−s)=1.

In this way, a concurrence of the first Radon-transform function $p_\theta(R)$ obtained by rotating θ from 0 degrees through 180-degree is called a signogram. The signogram is then Fourier-transformed so as to give a relation such as that shown in Formula 2 with a two-dimensional Fourier-transformed image function f(x,y) in the orthogonal coordinate system time domain.

$$P(\omega,\theta)=F(\omega \cos \theta, \omega \sin \theta)=F(\omega_x,\omega_y)|_{\omega_x=\omega \cos \theta, \omega_y=\omega \sin \theta} \qquad (2)$$

Here, P(ω,θ) is a Fourier-transformed function of the Radon-transform function $p_\theta(R)$. In addition, ω is $$\sqrt{\omega_x^2 + \omega_y^2},$$

and θ is $\tan^{-1}(\omega_y/\omega_x)$.

According to the Central Slice theory, the Fourier transform of the signogram is a one-dimensional function value obtained by cutting the Fourier-transformed function of a two-dimensional original image with respect to each θ axis. If this image is Radon-transformed and then Fourier-transformed, the image is transformed into an image of the polar coordinate system frequency domain.

Figure 2:
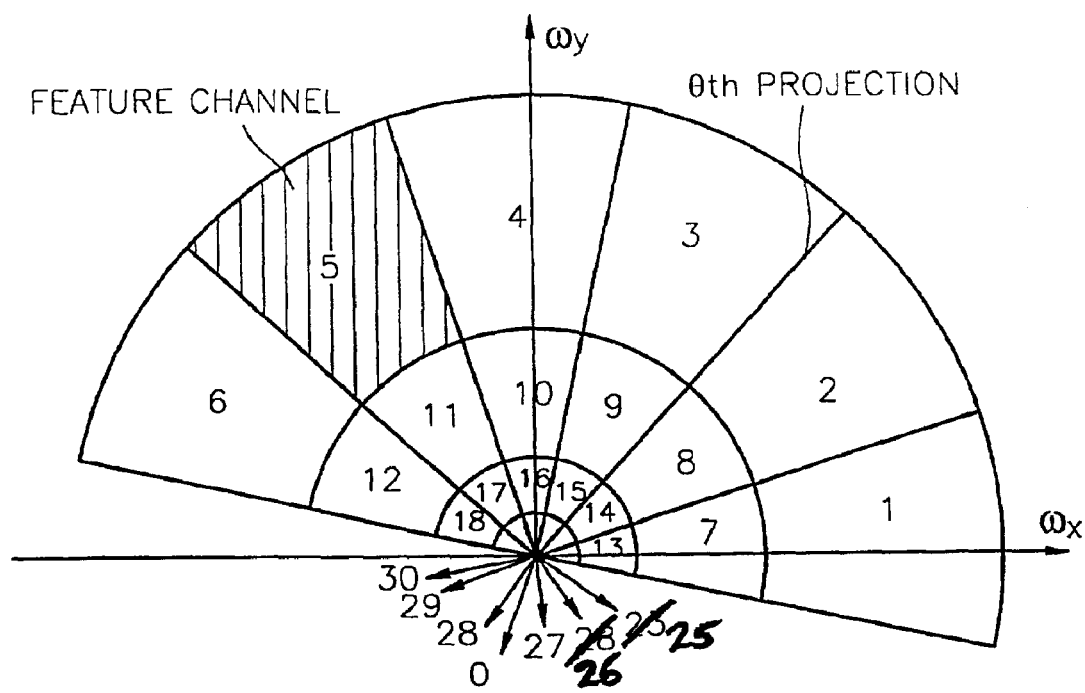
FIG. 2 illustrates a frequency domain division layout used for extracting texture descriptors of respective channels.
Figure 3:
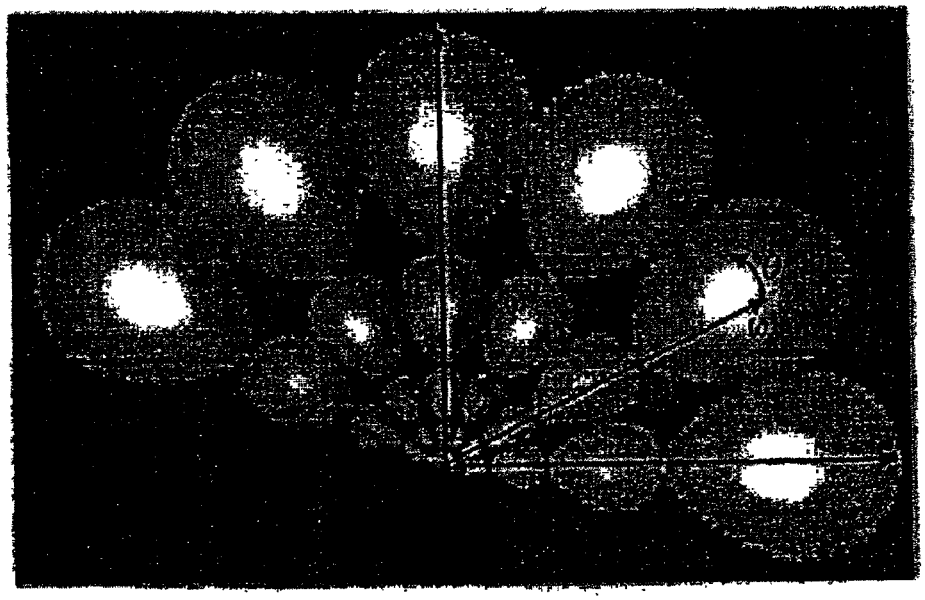
FIG. 3 illustrates a structure of a Gabor filter used for extracting texture descriptors of respective channels.

Next, in a step S13, filtering is performed using the frequency domain division layout as described in FIG. 2 in order to extract texture descriptors of respective channels. In FIG. 3, the frequency domain division layout of FIG. 2 is illustrated in a more practical form. Gabor filters for filtering in the step S13 can be understood to be designed on the basis of the divided feature channels as illustrated in FIG. 3. That is, in the preferred embodiment, the Gabor filtering is performed using Gabor filters designed on the basis of a 5×6 feature channel spaces divided into 5 regions in the radial direction and 6 regions in the angular direction. Here, respective divided frequency domains shown in FIG. 2 correspond to the feature channels.

The response features of the Gabor filter are expressed as Formula 3 in order to explain the operation of the Gabor filter designed as described above. Here, $A_{s,r}$ is $$G_{p_{s,r}}(\omega, \theta) = A_{s,r}\exp\left[\frac{-(\omega - \omega_s)^2}{2\sigma_{p_s}^2}\right] \cdot \exp\left[\frac{-(\theta - \theta_r)^2}{2\sigma_{\theta_r}^2}\right] \quad (3)$$

a constant, $G_{P_{s,r}}(\omega,\theta)$ indicates the response features of a filter corresponding to the feature channels of the s-th radial direction and the r-th angular direction, s indicates a position in the radial direction as an integer number among {0,1,2,3,4}, and r indicates a position in the angular direction as an integer number among {0,1,2,3,4,5}. Also, $\sigma_{p_s}^2$ and $\sigma_{\theta_r}^2$, respectively, are standard deviation values of feature channels of the coordinate p in the s direction and the coordinate θ in the r direction, and correspond to the width of the feature channels of the radial direction and angular direction.

In the Gabor filter having 5×6 filters as the preferred embodiment, exemplary standard deviations of the feature channels are tabulated in Tables 1 and 2. Variable values of the Gabor filter in the radial direction are tabulated in Table 1, and variable values of the Gabor filter in the angular direction are tabulated in Table 2.

TABLE 1

| Radial index (s) | 0 | 1 | 2 | 3 | 4 |
|---|---|---|---|---|---|
| Centre frequency ($\omega_s$) | $\frac{3}{4}$ | $\frac{3}{8}$ | $\frac{3}{16}$ | $\frac{3}{32}$ | $\frac{3}{64}$ |
| Octave bandwidth ($B_s$) | $\frac{1}{2}$ | $\frac{1}{4}$ | $\frac{1}{8}$ | $\frac{1}{16}$ | $\frac{1}{32}$ |
| $\sigma_{p_s}$ | $\frac{1}{\sqrt[4]{2\ln2}}$ | $\frac{1}{\sqrt[8]{2\ln2}}$ | $\frac{1}{\sqrt[16]{2\ln2}}$ | $\frac{1}{\sqrt[32]{2\ln2}}$ | $\frac{1}{\sqrt[64]{2\ln2}}$ |

TABLE 2

| Angular index (r) | 0 | 1 | 2 | 3 | 4 | 5 |
|---|---|---|---|---|---|---|
| Centre frequency ($\theta_r$) | 0° | 30° | 60° | 90° | 120° | 150° |
| Angular bandwidth | 30° | 30° | 30° | 30° | 30° | 30° |
| $\sigma_{\theta_r}$ | $\frac{30°}{\sqrt[2]{2\ln2}}$ | $\frac{30°}{\sqrt[2]{2\ln2}}$ | $\frac{30°}{\sqrt[2]{2\ln2}}$ | $\frac{30°}{\sqrt[2]{2\ln2}}$ | $\frac{30°}{\sqrt[2]{2\ln2}}$ | $\frac{30°}{\sqrt[2]{2\ln2}}$ |

Next, in a step S15, the texture features of images Gabor-filtered in the orthogonal coordinate system frequency domain or in the polar coordinate system frequency domain are extracted. Here, the orthogonal coordinate system frequency domain or the polar coordinate system frequency domain are divided on the basis of the human visual system (HVS) as illustrated in FIG. 2, and the divided frequency domains are each called feature channels. The feature channels are indicated as $C_i$, where i=6×s+r+1, and $C_0$ indicates a DC feature channel.

The polar coordinate system frequency domain division layout divides the frequency domain on the basis of the HVS. The −3 db pass band frequency features of the Gabor filter are designed to be disposed in a frequency domain to be suitable for the HVS. The frequency domain division method and design principle for the Gabor filter are similarly applied to the orthogonal coordinate system. That is, a feature of the HVS is that is sensitive to the low frequency components and insensitive to the high frequency components, and the frequency division layout is decided using these features. Hereinafter, this will be described in greater detail.

In the present invention, the energy mean value and energy variance value of the Gabor-filtered frequency domain are used as the texture features of the images.

FIG. 2 illustrates a polar coordinate frequency domain division layout for extracting the mean of energy on the basis of the HVS.

As shown in FIG. 2, the polar coordinate frequency domain is divided in the radial direction and the angular direction. The polar coordinate frequency domain is divided in the radial direction away from the origin at an octave interval, and in the angular direction θ is divided into 180/P (here, P is a division resolving power of θ). If the polar coordinate frequency domain is divided like this, in the polar coordinate frequency layout to extract the mean of energy, the low frequency domain is densely divided, and the high frequency domain is sparsely divided. The divided frequency domains are feature channels ($C_i$), and the hatched portion is the feature channel 5.

Here, important features of the present invention can be seen. Sampling of the low frequency domain is densely performed and sampling of the high frequency domain is sparsely performed by the Radon transform of the present invention, and when they are divided on the basis of the HVS, the low frequency domain is densely divided and the high frequency domain is sparsely divided. The respective divided frequency domains, that is, the feature values extracted from respective channels accurately reflect the texture features.

When the energy mean value and energy variance value of the respective channels are obtained, image texture descriptors for describing an image texture from the feature values in the step S15, that is, the feature vectors, are calculated. A method for obtaining the energy mean value and energy variance value will be described later.

The texture descriptors are expressed as Formula 4.

$$F = [f_{STD}, f_{DC}, e(1), \ldots, e(30), d(1), \ldots, d(30)] \quad (4)$$

Here, e(i) is the energy mean value of the i-th Gabor-filtered channel in the frequency layout of FIG. 2, and d(i) is the energy variance value of the i-th Gabor-filtered channel I in the frequency layout of FIG. 2. Here, in particular, $f_{DC}$ indicates an energy of the DC channel, and $f_{STD}$ indicates a variance of all of the pixel values of the image. The respective feature values of Formula 4 can be first described according to the order of priority of the channels, and the feature values of the channels having a low importance are excepted according to the importance of the channels, so that the amount of data can be reduced. Also, the texture descriptor feature vectors can be formed using only an energy of the respective channels as the feature values according to the importance of the feature or using both the energy and energy variance.

The energy mean value (e(i)) and the energy variance value (d(i)) forming the described feature vectors are obtained by Formulas 6 and 8, and in doing so, a value p(i) is obtained using a Gabor-filtered function ($G_{P_{s,r}}(\omega,\theta)\cdot P(\omega,\theta)$) after the Fourier-transform in Formula 5. If p(i) is applied to Formula 6, the energy mean value (e(i)) can be obtained. Also, in Formula 7, a value q(i) is obtained using the Fourier-transformed first Radon transformed function and the p(i) value obtained in Formula 5. If the q(i) is applied to Formula 8, the energy variance value (d(i)) can be obtained.

$$p(i) = \sum_{-\omega=0+}^{1} \sum_{\theta=0°+}^{360°} [G_{p_{sr}}(\omega, \theta) \cdot P(\omega, \theta)]^2 \quad (5)$$

$$e(i) = \log[1+p(i)] \quad (6)$$

$$q(i) = \sqrt{\sum_{\omega=0+}^{1} \sum_{\theta=0°+}^{360°} \{[G_{p_{sr}}(\omega, \theta) \cdot P(\omega, \theta)]^2 - p(i)\}^2} \quad (7)$$

$$d(i) = \log[1+q(i)] \quad (8)$$

In this way, the texture descriptors formed of the energy mean value and the energy variance value of the respective channels are obtained.

The step S11 or S16 is performed repeatedly on all input images, and the respective data texture descriptors are stored in the database.

The data texture descriptors stored in the database are matched with the query texture descriptors obtained from the query image and used for retrieving images similar to the query image. Hereinafter, the texture-based retrieval method according to a preferred embodiment of the present invention will be described.

It is supposed that the database is indexed using the data texture descriptors (F). Next, the query texture descriptor ($F_q$) is extracted according to the texture description method of FIG. 1, which describes the query image (q), and a conformity is measured by calculating a similarity between the texture descriptor ($F_d$) and the query texture descriptor ($F_q$) of arbitrary image data (d) within the database.

This similarity is inversely proportional to the distance ($D_m$) between two texture descriptors obtained by Formula 9.

$$d(q, d) = \text{distance}(F_q, F_d) = \sum_k \left| \frac{\omega(k)(f_q(k) - f_d(k))}{\alpha(k)} \right| \quad (9)$$

Here, $F=\{f(k), k=1, K\}$, and $\omega(k)$ indicate weight coefficients of each channel. In this way, the distance between the data texture descriptor and the query texture descriptor is obtained by comparing the mean with the variance by each channel. The result of Fourier-transforming the rotated image is the same as the result of rotating the image in the frequency domain during the Fourier-transform of the image before the rotation. Therefore, when comparing two images and retrieving, if comparing the images during the rotation in the frequency domain, two similar images having different rotation angles can be found. The rotation unchangeability is expressed as Formula 10.

$$d(q,d,m\phi) = \text{distance}(F_q(k)|_{m\phi}, F_d(k)) \quad (10)$$

Here, $\phi=30°$.

After the distance between two images is obtained by rotating the query image in the frequency domain and comparing the query image with the data image, the minimum value of the distance is used to indicate the amount of dissimilarity between the two final images. This is expressed as Formula 11.

$$d(q,d) = \text{minimum of } \{d(q,d,m\phi)|m=1 \text{ to } 6\} \quad (11)$$

Also, the result of Fourier-transform of the scaled image is the same as scaling, in the frequency domain, the result of Fourier-transformation of the original image. When comparing two images, if comparing the images during the scaling of the images in the frequency domain, two similar images having different sizes can be found. The scale invariance is expressed as Formula 12.

$$d(q,d,n) = \text{distance}(F_q(k)|_n, F_d(k)) \quad (12)$$

Here, n is possible number of scale changes for the query image. According to the preferred embodiment of the present invention, a texture-based image retrieving method includes the steps of scaling the query image in predetermined scales in the frequency domain, extracting the texture descriptor for each scale, calculating the distance between those texture descriptors with the texture descriptor of data image, and taking the minimum distance as the distance between the two images. The step of taking the minimum distance can be expressed as Formula 13.

$$d(q,d) = \text{minimum of } \{d(q,d,n)|n=1 \text{ to } N\} \quad (13)$$

Here, N is actual number of scaled images.

Though the present invention has been described on the basis of the preferred embodiments, the preferred embodiments are not intended to limit but to illustrate the present invention. It is obvious that various changes, amendments, or controls can be made by those skilled in the art without departing from the spirit and scope of the invention. Therefore, the present invention will be defined only by the appended claims, and the above examples of changes, modifications, or controls must be understood to be included in the present invention.

According to the present invention, not only can the texture of an image be described more accurately, but also effective indexing and retrieval becomes possible using the Gabor-filtering method in the frequency domain, the polar coordinate system frequency domain division layout suitable for extracting respective feature values, the method for extracting feature values in respective frequency domains, and the techniques for granting the importance and the order of priority to respective frequency channels.

The image texture descriptor extracted by the texture description method is very useful for image retrieval when searching for an image having a special feature in a huge aerial photograph and a radar image for military purpose.

What is claimed is:

1. A texture description method using a Gabor filter in a frequency domain for describing texture information of an image, comprising:
    (a) converting an input image by a frequency transformation process;
    (b) filtering the converted image via a Gabor filter having N×M filter regions to produce a filtered image, wherein N and M are predetermined positive integers;
    (c) determining texture feature values of the filtered image for respective channels, wherein said channels represent a frequency domain division layout corresponding to the N×M filter regions of the Gabor filter; and
    (d) determining an image texture descriptor of the converted image using the texture feature values.

2. The method of claim 1, wherein the operation (a) comprises:
    (a1) converting the input image into the converted image via a two-dimensional Fourier-transformation operation,
    wherein the converted image is an image of an orthogonal coordinate system frequency domain.

3. The method of claim 2, wherein the operation (c) comprises:
    (c1) determining the frequency domain division layout based one of a human visual system ("HVS").

4. The method of claim 3, wherein the operation (c1) comprises:
(c1a) defining channels within the frequency domain division frequency layout by:
(c1a1) dividing the frequency domain by an octave interval in a radial direction away from an origin of the frequency domain; and
(c1a2) dividing the frequency domain by a division resolving power interval in the angular direction over 180 degrees of the frequency domain.

5. The method of claim 3, wherein the operation (c) further comprises:
(c2) prioritizing channels of the frequency domain division layout.

6. The method of claim 3, wherein operation (c) further comprises:
(c2) calculating at least one of an energy mean value and an energy variance value for the channels of the filtered image; and
(c3) determining features values for the filtered image based on the at least one of the energy mean value and the energy variance value.

7. The method of claim 6, wherein the operation (d) comprises:
(d1) determining the image texture descriptor based on at least one of an energy of a DC channel of the frequency domain division frequency layout, a variance of all pixel values of the filtered image, the energy mean values of the channels, and the energy variance values of the channels.

8. The method of claim 7, wherein the operation (d1) comprises:
(d1a) determining the image texture descriptor based on the energy of the DC channel, the variance of all of the pixel values of the filtered image, the energy mean values of the channels, and the energy variance values of the channels.

9. The method of claim 1, wherein the operation (a) comprises:
(a1) converting the input image into the converted image via a Radon-transformation operation and a one-dimensional Fourier-transformation operation,
wherein the converted image is an image of a polar coordinate system frequency domain.

10. The method of claim 9, wherein the operation (c) comprises:
(c1) determining the frequency domain division layout based one of a human visual system ("HVS").

11. The method of claim 10, wherein the operation (c1) comprises:
(c1a) defining channels within the frequency domain division frequency layout by:
(c1a1) dividing the frequency domain by an octave interval in a radial direction away from an origin of the frequency domain; and
(c1a2) dividing the frequency domain by a division resolving power interval in the angular direction over 180 degrees of the frequency domain.

12. The method of claim 10, wherein the operation (c) further comprises:
(c2) prioritizing channels of the frequency domain division layout.

13. The method of claim 10, wherein operation (c) further comprises:
(c2) calculating at least one of an energy mean value and an energy variance value for the channels of the filtered image; and
(c3) determining features values for the filtered image based on the at least one of the energy mean value and the energy variance value.

14. The method of claim 13, wherein the operation (d) comprises:
(d1) determining the image texture descriptor based on at least one of an energy of a DC channel of the frequency domain division frequency layout, a variance of all pixel values of the filtered image, the energy mean values of the channels, and the energy variance values of the channels.

15. The method of claim 14, wherein the operation (d1) comprises:
(d1a) determining the image texture descriptor based on the energy of the DC channel, the variance of all of the pixel values of the filtered image, the energy mean values of the channels, and the energy variance values of the channels.

16. The method of claim 1, wherein the operation (c) comprises:
(c1) determining the frequency domain division layout based one of a human visual system ("HVS").

17. The method of claim 16, wherein the operation (c1) comprises:
(c1a) defining channels within the frequency domain division frequency layout by:
(c1a1) dividing the frequency domain by an octave interval in a radial direction away from an origin of the frequency domain; and
(c1a2) dividing the frequency domain by a division resolving power interval in the angular direction over 180 degrees of the frequency domain.

18. The method of claim 16, wherein the operation (c) further comprises:
(c2) prioritizing channels of the frequency domain division layout.

19. The method of claim 16, wherein operation (c) further comprises:
(c2) calculating at least one of an energy mean value and an energy variance value for the channels of the filtered image; and
(c3) determining features values for the filtered image based on the at least one of the energy mean value and the energy variance value.

20. The method of claim 19, wherein the operation (d) comprises:
(d1) determining the image texture descriptor based on at least one of an energy of a DC channel of the frequency domain division frequency layout, a variance of all pixel values of the filtered image, the energy mean values of the channels, and the energy variance values of the channels.

21. The method of claim 20, wherein the operation (d1) comprises:
(d1a) determining the image texture descriptor based on the energy of the DC channel, the variance of all of the pixel values of the filtered image, the energy mean values of the channels, and the energy variance values of the channels.

22. A computer readable medium containing a program that executes a routine, comprising:
(a) converting an input image by a frequency transformation process;
(b) filtering the converted image via a Gabor filter having N×M filter regions to produce a filtered image, wherein N and M are predetermined positive integers;

(c) determining texture feature values of the filtered image for respective channels, wherein said channels represent a frequency domain division layout corresponding to the N×M filter regions of the Gabor filter; and (d) determining an image texture descriptor of the converted image using the texture feature values.

23. The computer readable medium of claim 22, wherein the operation (a) comprises:

(a1) converting the input image into the converted image via a two-dimensional Fourier-transformation operation, wherein the converted image is an image of an orthogonal coordinate system frequency domain.

24. The computer readable medium of claim 23, wherein the operation (c) comprises:

(c1) determining the frequency domain division layout based one of a human visual system ("HVS").

25. The computer readable medium of claim 24, wherein the operation (c1) comprises:

(c1a) defining channels within the frequency domain division frequency layout by:

(c1a1) dividing the frequency domain by an octave interval in a radial direction away from an origin of the frequency domain; and (c1a2) dividing the frequency domain by a division resolving power interval in the angular direction over 180 degrees of the frequency domain.

26. The computer readable medium of claim 24, wherein the operation (c) further comprises:

(c2) prioritizing channels of the frequency domain division layout.

27. The computer readable medium of claim 24, wherein operation (c) further comprises:

(c2) calculating at least one of an energy mean value and an energy variance value for the channels of the filtered image; and (c2) determining features values for the filtered image based on the at least one of the energy mean value and the energy variance value.

28. The computer readable medium of claim 27, wherein the operation (d) comprises:

(d1) determining the image texture descriptor based on at least one of an energy of a DC channel of the frequency domain division frequency layout, a variance of all pixel values of the filtered image, the energy mean values of the channels, and the energy variance values of the channels.

29. The computer readable medium of claim 28, wherein the operation (d1) comprises:

(d1a) determining the image texture descriptor based on the energy of the DC channel, the variance of all of the pixel values of the filtered image, the energy mean values of the channels, and the energy variance values of the channels.

30. The computer readable medium of claim 22, wherein the operation (a) comprises:

(a1) converting the input image into the converted image via a Radon-transformation operation and a one-dimensional Fourier-transformation operation, wherein the converted image is an image of a polar coordinate system frequency domain.

31. The computer readable medium of claim 30, wherein the operation (c) comprises:

(c1) determining the frequency domain division layout based one of a human visual system ("HVS").

32. The computer readable medium of claim 31, wherein the operation (c1) comprises:

(c1a) defining channels within the frequency domain division frequency layout by:

(c1a1) dividing the frequency domain by an octave interval in a radial direction away from an origin of the frequency domain; and (c1a2) dividing the frequency domain by a division resolving power interval in the angular direction over 180 degrees of the frequency domain.

33. The computer readable medium of claim 31, wherein the operation (c) further comprises:

(c2) prioritizing channels of the frequency domain division layout.

34. The computer readable medium of claim 31, wherein operation (c) further comprises:

(c2) calculating at least one of an energy mean value and an energy variance value for the channels of the filtered image; and (c3) determining features values for the filtered image based on the at least one of the energy mean value and the energy variance value.

35. The computer readable medium of claim 34, wherein the operation (d) comprises:

(d1) determining the image texture descriptor based on at least one of an energy of a DC channel of the frequency domain division frequency layout, a variance of all pixel values of the filtered image, the energy mean values of the channels, and the energy variance values of the channels.

36. The computer readable medium of claim 35, wherein the operation (d1) comprises:

(d1a) determining the image texture descriptor based on the energy of the DC channel, the variance of all of the pixel values of the filtered image, the energy mean values of the channels, and the energy variance values of the channels.

37. The computer readable medium of claim 22, wherein the operation (c) comprises:

(c1) determining the frequency domain division layout based one of a human visual system ("HYS").

38. The computer readable medium of claim 37, wherein the operation (c1) comprises:

(c1a) defining channels within the frequency domain division frequency layout by:

(c1a1) dividing the frequency domain by an octave interval in a radial direction away from an origin of the frequency domain; and (c1a2) dividing the frequency domain by a division resolving power interval in the angular direction over 180 degrees of the frequency domain.

39. The computer readable medium of claim 37, wherein the operation (c) further comprises:

(c2) prioritizing channels of the frequency domain division layout.

40. The computer readable medium of claim 39, wherein the operation (d) comprises:

(d1) determining the image texture descriptor based on at least one of an energy of a DC channel of the frequency domain division frequency layout, a variance of all pixel values of the filtered image, the energy mean values of the channels, and the energy variance values of the channels.

41. The computer readable medium of claim 40, wherein the operation (d1) comprises:

(d1a) determining the image texture descriptor based on the energy of the DC channel, the variance of all of the pixel values of the filtered image, the energy mean values of the channels, and the energy variance values of the channels.

42. The computer readable medium of claim 37, wherein operation (c) further comprises:
   (c2) calculating at least one of an energy mean value and an energy variance value for the channels of the filtered image; and
   (c3) determining features values for the filtered image based on the at least one of the energy mean value and the energy variance value.

43. A texture-based image retrieval method using a Gabor filter in a frequency domain for texture-based retrieving a data image similar to a query image, comprising:
   (1) inputting a query image;
   (2) determining a query texture descriptor of a query image by using a Gabor filter when the query image is input;
   (3) determining a distance between the query texture descriptor and a data texture descriptor, wherein the data texture descriptor is previously stored in a texture descriptor database and wherein the data texture descriptor is determined by filtering a data image via a Gabor filter; and
   (4) determining a similarity between the query image and the data image based on the distance between the query image descriptor and the data image descriptor;
   wherein the operation (2) comprises:
      (a) converting the input query image by a frequency transformation process;
      (b) filtering the converted query image via a Gabor filter having N×M filter regions to produce a filtered image, wherein N and M are predetermined positive integers;
      (c) determining texture feature values of the filtered image for respective channels, wherein said channels represent a frequency domain division layout corresponding to the N×M filter regions of the Gabor filter; and
      (d) determining the query texture descriptor of the converted query image using the texture feature values.

44. The method of claim 43, wherein the operation (a) comprises:
   (a1) converting the input query image into the converted query image via a two-dimensional Fourier-transformation operation,
   wherein the converted query image is an image of an orthogonal coordinate system frequency domain.

45. The method of claim 44, wherein the operation (c) comprises:
   (c1) determining the frequency domain division layout based one of a human visual system ("HVS").

46. The method of claim 45, wherein the operation (c1) comprises:
   (c1a) defining channels within the frequency domain division frequency layout by:
      (c1a1) dividing the frequency domain by an octave interval in a radial direction away from an origin of the frequency domain; and
      (c1a2) dividing the frequency domain by a division resolving power interval in the angular direction over 180 degrees of the frequency domain.

47. The method of claim 45, wherein the operation (c) further comprises:
   (c2) prioritizing channels of the frequency domain division layout.

48. The method of claim 45, wherein operation (c) further comprises:
   (c2) calculating at least one of an energy mean value and an energy variance value for the channels of the filtered image; and
   (c3) determining features values for the filtered image based on the at least one of the energy mean value and the energy variance value.

49. The method of claim 48, wherein the operation (d) comprises:
   (d1) determining the image texture descriptor based on at least one of an energy of a DC channel of the frequency domain division frequency layout, a variance of all pixel values of the filtered image, the energy mean values of the channels, and the energy variance values of the channels.

50. The method of claim 49, wherein the operation (d1) comprises:
   (d1a) determining the image texture descriptor based on the energy of the DC channel, the variance of all of the pixel values of the filtered image, the energy mean values of the channels, and the energy variance values of the channels.

51. The method of claim 48, wherein operation (c) comprises:
   (c4) determining the distance between two texture descriptors by comparing the respective feature values corresponding to the respective channels of the filtered image of the query image with respective feature values corresponding to respective channels of a filtered image of the data image.

52. The method of claim 51, wherein the distance between the query image and the data image is measured by rotating the query image in a predetermined degree in the frequency domain, and the minimum distance is determined as the distance between two images.

53. The method of claim 43, wherein the operation (a) comprises:
   (a1) converting the input query image into the converted query image via a Radon-transformation operation and a one-dimensional Fourier-transformation operation,
   wherein the converted query image is an image of a polar coordinate system frequency domain.

54. The method of claim 53, wherein the operation (c) comprises:
   (c1) determining the frequency domain division layout based one of a human visual system ("HYS").

55. The method of claim 54, wherein the operation (c1) comprises:
   (c1a) defining channels within the frequency domain division frequency layout by:
      (c1a1) dividing the frequency domain by an octave interval in a radial direction away from an origin of the frequency domain; and
      (c1a2) dividing the frequency domain by a division resolving power interval in the angular direction over 180 degrees of the frequency domain.

56. The method of claim 54, wherein the operation (c) further comprises:
   (c2) prioritizing channels of the frequency domain division layout.

57. The method of claim 54, wherein operation (c) further comprises:
   (c2) calculating at least one of an energy mean value and an energy variance value for the channels of the filtered image; and (c3) determining features values for the filtered image based on the at least one of the energy mean value and the energy variance value.

58. The method of claim 57, wherein the operation (d) comprises:
(d1) determining the image texture descriptor based on at least one of an energy of a DC channel of the frequency domain division frequency layout, a variance of all pixel values of the filtered image, the energy mean values of the channels, and the energy variance values of the channels.

59. The method of claim 58, wherein the operation (d1) comprises:
(d1a) determining the image texture descriptor based on the energy of the DC channel, the variance of all of the pixel values of the filtered image, the energy mean values of the channels, and the energy variance values of the channels.

60. The method of claim 57, wherein operation (c) comprises:
(c4) determining the distance between two texture descriptors by comparing the respective feature values corresponding to the respective channels of the filtered image of the query image with respective feature values corresponding to respective channels of a filtered image of the data image.

61. The method of claim 60, wherein the distance between the query image and the data image is measured by rotating the query image in a predetermined degree in the frequency domain, and the minimum distance is determined as the distance between two images.

62. The method of claim 43, wherein the operation (c) comprises:
(c1) determining the frequency domain division layout based one of a human visual system ("HVS").

63. The method of claim 62, wherein the operation (c1) comprises:
(c1a) defining channels within the frequency domain division frequency layout by:
(c1a1) dividing the frequency domain by an octave interval in a radial direction away from an origin of the frequency domain; and
(c1a2) dividing the frequency domain by a division resolving power interval in the angular direction over 180 degrees of the frequency domain.

64. The method of claim 62, wherein the operation (c) further comprises:
(c2) prioritizing channels of the frequency domain division layout.

65. The method of claim 62, wherein operation (c) further comprises:
(c2) calculating at least one of an energy mean value and an energy variance value for the channels of the filtered image; and
(c3) determining features values for the filtered image based on the at least one of the energy mean value and the energy variance value.

66. The method of claim 65, wherein the operation (d) comprises:

(d1) determining the image texture descriptor based on at least one of an energy of a DC channel of the frequency domain division frequency layout, a variance of all pixel values of the filtered image, the energy mean values of the channels, and the energy variance values of the channels.

67. The method of claim 66, wherein the operation (d1) comprises:
(d1a) determining the image texture descriptor based on the energy of the DC channel, the variance of all of the pixel values of the filtered image, the energy mean values of the channels, and the energy variance values of the channels.

68. The method of claim 65, wherein operation (c) comprises:
(c4) determining the distance between two texture descriptors by comparing the respective feature values corresponding to the respective channels of the filtered image of the query image with respective feature values corresponding to respective channels of a filtered image of the data image.

69. The method of claim 68, wherein the distance between the query image and the data image is measured by rotating the query image in a predetermined degree in the frequency domain, and the minimum distance is determined as the distance between two images.

70. A computer readable medium containing a program that executes a routine, comprising:
(1) inputting a query image;
(2) determining a query texture descriptor of the query image by using a Gabor filter when the query image is input;
(3) determining a distance between the query texture descriptor and a data texture descriptor, wherein the data texture descriptor is previously stored in a texture descriptor database and wherein the data texture descriptor is determined by filtering a data image via a Gabor filter; and
(4) determining a similarity between the query image and the data image based on the distance between the query image descriptor and the data image descriptor;
wherein the operation (2) comprises:
(a) converting the input query image by a frequency transformation process;
(b) filtering the converted query image via a Gabor filter having N×M filter regions to produce a filtered image, wherein N and M are predetermined positive integers;
(c) determining texture feature values of the filtered image for respective channels, wherein said channels represent a frequency domain division layout corresponding to the N×M filter regions of the Gabor filter; and
(d) determining an image texture descriptor of the converted query image using the texture feature values.

* * * * *